July 12, 1966  R. BRANDT ETAL  3,260,410
COLLAPSIBLE CONTAINER STRUCTURE
Filed Nov. 13, 1962  2 Sheets-Sheet 1

INVENTORS
ROGER BRANDT
RALPH WILLIAM KAERCHER
BY
Bertram F. Claeboe
George W. Reiber
ATTORNEYS July 12, 1966  R. BRANDT ETAL  3,260,410
COLLAPSIBLE CONTAINER STRUCTURE
Filed Nov. 13, 1962  2 Sheets-Sheet 2

INVENTORS
ROGER BRANDT
RALPH WILLIAM KAERCHER
BY Bertram F. Claeboe
George W. Reiber
ATTORNEYS _United States Patent Office_

3,260,410
Patented July 12, 1966

3,260,410
COLLAPSIBLE CONTAINER STRUCTURE
Roger Brandt, Andover, Mass., and Ralph William Kaercher, Barrington, Ill., assignors to American Can Company, New York, N.Y., a corporation of New Jersey
Filed Nov. 13, 1962, Ser. No. 236,906
24 Claims. (Cl. 222—107)

The present invention relates broadly to the container art, and is more particularly concerned with a collapsible dispensing container of laminated wall construction characterized by superior resistance to delamination and stress cracking.

Collapsible tubes formed of metallic and plastic materials have long been known in the packaging field. Extruded metal tubes, and particularly those constructed of lead, are inherently brittle and repeated use not infrequently results in wall cracks so that product is exuded from a location other than the dispensing orifice. Aluminum tubes, while being less brittle, are somewhat limited in their applications since to date it has not been possible to apply to the interior surfaces thereof a completely satisfactory coating, when required to prevent attack and corrosion of the metal by alkaline or acid contents and contamination of the contents by the reaction products. And notwithstanding the relatively brittle nature of lead tubes, the mentioned internal coating operation requires an additional processing step which necessarily increases the cost of the final article.

Tubes formed of polyethylene and other plastic materials have enjoyed wide commercial success in the packaging of many products, however, certain other products after a time have been noted to deteriorate when contained therein. Plastics as exemplified by polyethylene are permeable to a degree when employed in the wall thicknesses used in tubular containers, and the essential oils embodied in most dentifrices for flavoring purposes are reduced in volume during storage of the container, rendering the dentifrice less palatable. Then too, the plastic container wall absorbs oxygen after a period of time and ultimately may decompose the product, which has actually been found to be the case with fluoride-containing toothpastes.

It has accordingly been proposed to provide a relatively thin metallic barrier between the product and the polyethylene tube body to prevent the mentioned loss of essential oils and the absorption of oxygen. The metallic barrier has been suggested as an interlayer between facing sheets of polyethylene, and that a laminate be formed by heat with or without suitable adhesives. However, applicants have discovered after extensive investigations that it is extremely difficult, and in many instances virtually impossible, to achieve a commercially acceptable bond between presently known ethylene polymers and a metallic substrate which will not be impaired in the presence of a product exemplified by fluoride-containing dentifrices under accepted time and temperature conditions.

More specifically, a three-ply laminate formed of an intermediate layer of aluminum foil and faced on opposite surfaces with conventional low or high density polyethylenes exhibits almost universally severe delamination at the plastic-foil interfaces when exposed to a paste dentifrice containing stannous fluoride under normal shelf life conditions typified by one year at 100° F. The addition during the laminating operation of known adhesives has not to date provided a commercially acceptable structure, and other variations in the laminating procedure such as pre-heating the foil have likewise not produced the results required. In brief, conventional polyolefins do not provide the requisite adhesion to a metallic substrate, and further, they have a tendency toward stress cracking under particular conditions.

However, applicants have discovered that a container body material of superior resistance to delamination and stress cracking is obtained when the plastic layer of the laminate takes the form of a copolymer of an olefin and a polar group-containing monomer which is co-polymerizable therewith. Many compounds of course satisfy this definition, although in investigations conducted thus far especially satisfactory results have been produced by use of a copolymer of ethylene and an acrylic acid. A copolymer of this character is employed as the inner layer of the laminated wall container and is therefore in direct contact with the product, while the opposite surface of the foil barrier is desirably in bonded contact with the same copolymer, polyethylene, paper or any other materials capable of protecting the foil and facilitating the tube forming operation. However, it is within the contemplation of this invention that laminated tube body may be comprised solely of an inner layer of the named copolymer and an outer metallic foil layer, the copolymer being compatible with known molding compounds so as to bond to any of said compounds during formation of a head-piece on the tubular body, providing an integrated structure. In such an arrangement the foil layer of course will be of sufficient wall thickness to reduce the likelihood of damage thereto.

It is accordingly an important aim of the present invention to provide a collapsible dispensing container of laminated wall construction characterized by superior resistance to delamination and stress cracking.

Another object of this invention lies in the provision of a tubular container having a plurality of adherent layers in the body portion thereof, one of said layers providing a barrier to product permeation and oxygen absorption and another of said layers being a copolymer of an olefin and a polar group-containing monomer which is co-polymerizable therewith.

Still another object of the instant invention is to provide a tubular container of the foregoing character, in which the copolymer is a copolymer of ethylene and an acrylic acid.

A further object of this invention lies in the provision of a method of producing laminated tubes in which a tubular body is formed of a barrier layer and a layer laminated thereto of a copolymer of an olefin and a polar group-containing monomer which is co-polymerizable therewith, and a head-piece then bonded to the tubular body along said copolymer layer to provide an integral container.

An even further object of this invention is to provide a laminated container comprised of an intermediate layer of metallic foil having bonded to one surface thereof a polyolefin and to the opposite surface thereof a copolymer of an olefin and an ethylenically unsaturated carboxylic acid.

Other objects and advantages of the invention will become more apparent as the description proceeds, particularly when taken in connection with the accompanying drawings.

In the drawings, wherein like numerals are employed to designate like parts throughout the same:

Figure 1:
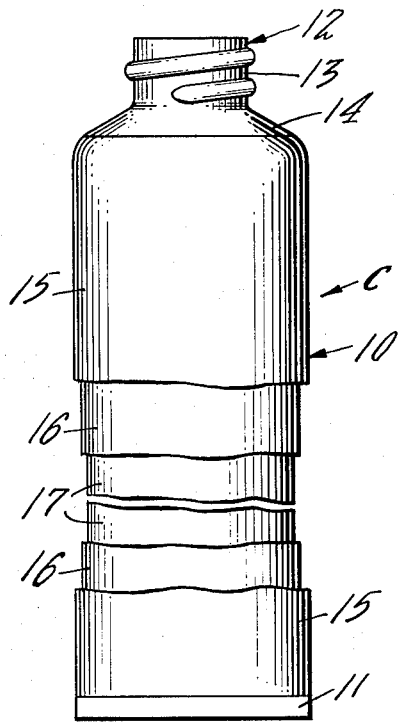
FIGURE 1 is a side elevational view of a collapsible dispensing container embodying the novel concepts of this invention, with portions of the body walls thereof being broken away to more fully illustrate the laminated structure.

Referring now first to FIGURE 1 of the drawings, a container constructed in accordance with the principles of this invention is designated generally therein by the legend C and comprises a collapsible body portion 10 closed at one end by heat sealing or other techniques, as indicated at 11. The tubular body mounts at its opposite end a plastic head-piece 12 shaped to provide a neck portion 13 and breast portion 14, the latter being fused to the inner layer of the container body portion in a manner which will shortly be described.

The tubular body portion 10 in the exemplary embodiment illustrated comprises three layers laminated or otherwise bonded one to the other, although as will be noted hereinafter, particular applications may permit a reduction in the number of layers to two while other environments may render desirable the use of four or more layers in the laminate. However, as shown, the collapsible body portion includes an outer layer 15 desirably provided by a thermoplastic material such as a polyolefin, although paper can be used in certain instances and of course in this event the laminating and tube forming techniques would be suitably modified in a manner which will be later set forth. Preferably though, the outer protective medium is a polyolefin illustratively taking the form of polyethylene, but it will be appreciated that the layer 15 may have the same composition as inner layer 17 laminated to the opposite surface of intermediate layer 16.

The interlayer 16, which provides the barrier protection against oxygen absorption from atmosphere and essential oil permeation outwardly through the tube body, is a metallic foil having a thickness sufficient to impart the requisite barrier properties and yet is maintained relatively thin in the interest of cost and pliability of the container during use. Aluminum foil has been found suitable, and the intermediate layer 16 may have printing or ornamental indicia applied thereto on its outer surface, as will be noted in connection with a description of FIGURES 4 and 5. In this event the outer layer 15 will be transparent to permit the indicia to be seen. The layer 15 thus protects the indicia, and by providing the ornamentation or printing on the interlayer, treatment of the outer layer to render it more receptive to inks is eliminated.

As was earlier noted, the composition of the inner layer 17 is extremely important in achieving a bond with the foil layer 16 which will not delaminate upon direct exposure to certain products, particularly those of a highly acidic nature and which may be exemplified in the present instance by fluoride-containing toothpastes. Markedly improved resistance to delamination is achieved by this invention when the thermoplastic layer 17 is broadly a copolymer of an olefin and a polar group-containing monomer co-polymerizable therewith or as otherwise may be stated, when this layer is a copolymer of an olefin and an ethylenically unsaturated carboxylic acid.

Preferably, the copolymer is of the random type and has a carboxylic acid content from about 0.5 to about 20 percent by weight, based on copolymer weight. The melt index of the copolymer is between 1 and 50. Quite clearly, many copolymers suited for the present invention fall within the above definition, and investigations conducted thus far have established that desirably the olefin is ethylene and the acid an ethylenically unsaturated monocarboxylic acid such as acrylic acid or alkacrylic acid, the former being more desirable at present.

Particularly satisfactory results have been obtained when the inner layer 17 of the laminated body portion 10 is a thermoplastic resin which is a random copolymer of ethylene and acrylic acid made according to the known high pressure process for making low density polyethylene. This specific copolymer has a copolymerized acrylic acid content in the neighborhood of 3, plus or minus 0.5, by weight based on copolymer weight, and a melt index of 8, plus or minus 1.

Figure 2:
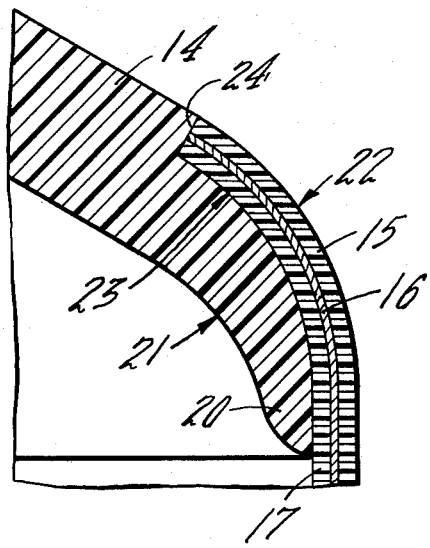
FIGURE 2 is an enlarged fragmentary sectional view showing one form of fused joint between the laminated wall structure and head-piece.

A laminated wall structure employing as the inner layer thereof a copolymer of ethylene and acrylic acid, when produced under the exemplary conditions to be herein described, has been found to display no visible signs of delamination from the metallic substrate 16 when exposed to a commercially available fluoride-containing dentifrice for 60 days at 120° F., which is regarded in the art as approximately equivalent to a one year exposure at 100° F. or two years at 80° F. A tubular container C as shown in FIGURES 1 and 2 and having an outer layer 15 of polyethylene or the same copolymer as the inner layer 17 also displayed excellent stress crack resistance, and the innermost layer 17 provides a highly adherent bond with the thermoplastic of the head-piece 12, particularly when the member 12 is molded to the configuration of FIGURE 2.

As appears therein, the head-piece 12 is formed with a substantially cylindrical skirt portion 20 and a peripheral inwardly curved portion 21 merging into the sloping breast portion 14 which mounts the upstanding axially passaged neck portion 13, shown as externally threaded to receive an internally threaded closure (not shown). All portions of the head-piece are of course of sufficient thickness to be substantially rigid and dimensionally stable.

The skirt portion 20 has substantially the same diameter as the inner diameter of the tube body 10 and is disposed therewithin with upper end 22 of the body 10 curved inwardly to overlie the inwardly curved portion 21 of the head-piece 12. The inner thermoplastic layer 17 of the tube body is fused to the skirt portion 20 and curved portion 21 of the head to form an exceptionally strong head joint 23. The continuous peripheral and vertical fused areas of the joint 23 result in a strong attachment of the head-piece 12 to the tube body 10 with a high resistance to separation by either axial, radial or twisting forces, or combinations thereof. Preferably, the upper end 22 of the tube body 10 is recessed into the head 12, assuring that the metallic interlayer 16 is not exposed along the marginal edge thereof, and the outer layer 15 of the body is welded at its edge 24 to the material of the head so that the outer surface of the joint 23 is a smooth substantially uninterrupted surface. As was stated, the thermoplastic of the head may be low or high density polyethylene, or a different polyolefin, or it could be the same copolymer as forms the inner layer 17, or any one of a number of different thermoplastics which are readily moldable and bond well to the resin of the inner layer 17.

Figure 4:
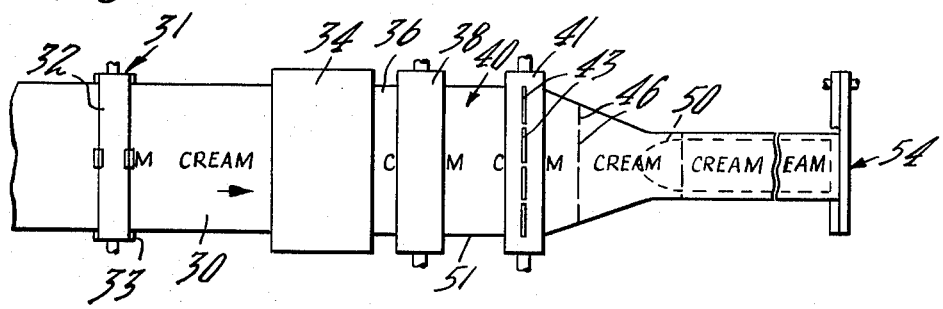
FIGURE 4 is a schematic top plan view of an exemplary process for forming laminated tube bodies.
Figure 5:
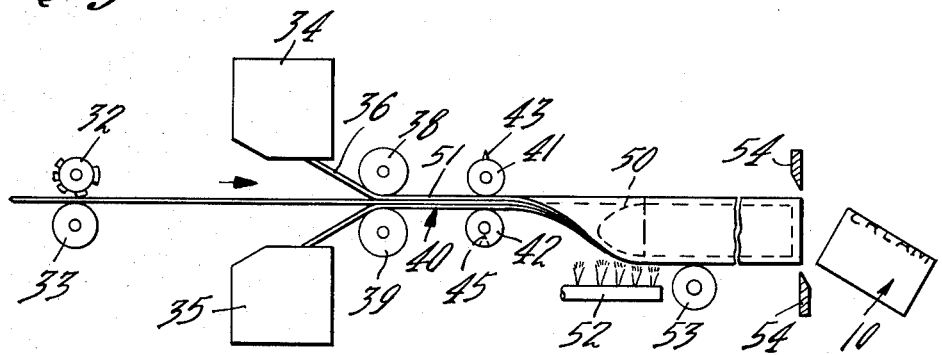
FIGURE 5 is a side elevational view of the arrangement of FIGURE 4.

Any one of a number of different techniques may be employed to form the tube bodies 10, and one suitable process is illustrated in FIGURES 4 and 5. A continuous base web 30 of foil material may first be passed through a printing unit 31 if it is desired to provide preprinted tube bodies in contrast with later applying suitable indicia to the outer thermoplastic layer 15. The printing unit 31 applies indicia on the upper surface of the web or foil strip, and a single printing roll is illustrated at 32 in back-up relation with a roll 33. Of course, multiple rolls may be used in those instances where a multi-color design is desired.

The continuous foil layer 30 then passes between upper and lower plastic extrusion devices 34 and 35 from which plastic webs or strips 36 and 37 are continuously extruded. The plastic webs 36 and 37 are brought into contact with the upper and lower surfaces of the base material 30 and laminated thereto by driven pressure rolls 38 and 39 to form a laminated web structure 40. Desirably the rate of extrusion of the thermoplastic webs 36 and 37 is less than the linear velocity of the foil base 30 and rolls 38 and 39 so that the extruded plastic webs are drawn down and thinned in the conventional manner prior to being laminated to the base material.

In the technique illustrated in FIGURES 4 and 5, the thermoplastic and foil webs are coextensive in width although if desired the intermediate foil layer may be of lesser width than the facing thermoplastic strips. By so proceeding, additional plastic material extends beyond the longitudinal side edges of the foil and can be utilized during the later side-seaming operation.

The laminated web 40 next passes between a pair of driven rolls 41 and 42, the former roll having a plurality of cutting knives 43 mounted on the surface thereof along a line parallel to its axis of rotation and registrable with and receivable in a similarly positioned series of grooves 45 on the surface of the roll 42. The action of the knives 43 is to periodically produce a series of slits 46 in the laminated web 40 along a line transverse to its longitudinal axis. The circumferential dimension of the rolls 41 and 42 is equal to the desired length of the tube bodies 10, so that the slits 46 are produced in the laminated web 40 at longitudinally spaced intervals equal to the desired length of the tube bodies. It can be appreciated, however, that provision of the slits 46 is not at all times required, and that by suitably indexing the later to be desired severing means, tube bodies of uniform lengths can be produced.

The edges of the laminated web 40 are then directed downwardly around a cylindrical mandrel 50 to form the web into a tubular configuration with the opposite longitudinal margins 51 of the laminated web in overlapping relation. The overlapped margins are then heated by suitable means, such as a tape sealer or gas heater 52, and then compressed between the mandrel 50 and a pressure roller 53 to fuse the thermoplastic layers thereby forming and sealing the seam.

After the side seam is formed in the continuous tube, the tube is severed along the lines formed by the now circumferentially disposed slits 46 to produce the tube bodies 10 of the desired length. As appears in FIGURES 4 and 5, a pair of oscillatable shear blades 54 are employed for the severing operation.

Figure 6:
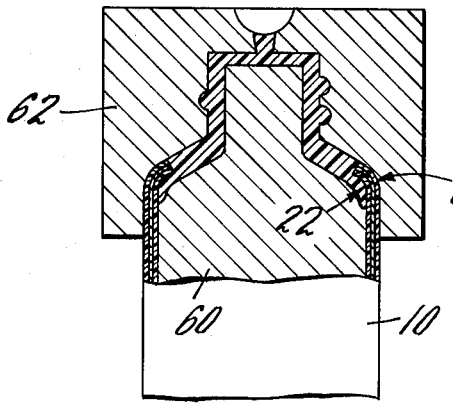
FIGURE 6 is a sectional view showing one technique which may be employed to mold and fuse a head-piece to the laminated tube body.

The tube bodies 10 as thus produced are then ready for the heading operation, and a highly successful technique for forming the head-piece and fusing it to the upper end of the tube body to provide the joint 23 of FIGURE 2 is illustrated in FIGURE 6. The tube body 10 is located upon a mandrel 60 of an injection molding device with the end 22 of the tube body extending into and abutting an inwardly curved surface 61 of a female mold member 62. The curved surface 61 of the mold member forms and bends the end 22 of the tube body 10 inwardly. While the end 22 is thus positioned and held in the mold, heated thermoplastic material is injected into the mold cavity to form the head-piece 12 and simultaneously weld it to the thermoplastic layers 15 and 17 of the tube body 10, thereby forming a joint 23 which is highly resistant to fracture.

While by the technique described in connection with FIGURE 6, the head-piece 12 is formed and fused to the tube body 10 in a single operation, and an overlap provided between the lower end of the head-piece and the upper end of the tube body using an injection molding process, obviously like results can be achieved using equivalent processes, as for example, compression molding may be employed, or a body of thermoplastic material of the requisite diameter and thickness can be blanked from a thermoplastic web and compacted to the desired head configuration by male and female mold members, while essentially simultaneously forming the shoulder overlap bond.

Figure 3:
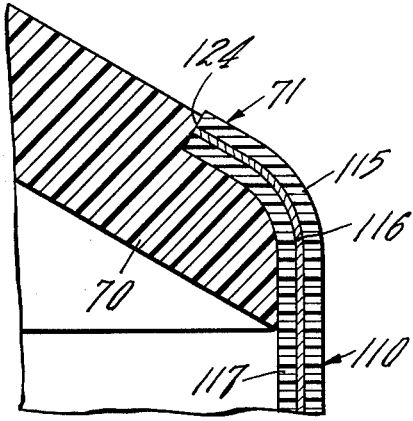
FIGURE 3 is a view similar to FIGURE 2, and illustrating another form of joint construction.

In addition to the above-described methods of forming the head-piece and fusing the same to the laminated tubular body, the head-piece may be formed as a separate operation and thereafter attached to the tube body by heat sealing. A joint structure of this character is illustrated in FIGURE 3, wherein a head-piece 70 is first molded in a conventional manner, as by injection molding. The head member 70 is then positioned within a tube body 110, end portion 71 of the body folded inwardly upon the head member, and heat and pressure applied thereto for effecting a fused connection between the thermoplastic of the head-piece and inner thermoplastic layer 117 of the tube body. Of course, the outer thermoplastic layer 115 may be ironed to a greater degree than shown so as to mold end portion 124 thereof more smoothly into the head-piece.

The presently preferred joint structure is, however, that shown in FIGURE 2 and a highly effective heading technique for achieving this particular joint is illustrated in FIGURE 6. The fused connection made has great resistance to fracture or separation by either axial, radial or twisting forces or combinations thereof, and it may be noted in this regard that the resinous copolymer forming the inner layer 17 of the tube body 10 bonds well with a wide range of polyolefins, in addition to possessing the important properties of being highly resistive to delamination and stress cracking.

The markedly improved adhesion to metallic substrates provided by a copolymer of ethylene and acrylic acid is believed clearly demonstrated by the following example.

*Example*

An aluminum foil base having a thickness of about 0.0005 inch was heated to a temperature of approximately 350° F., and by proceeding essentially as shown in FIGURES 4 and 5 of the application drawings, one face of the heated foil was contacted by an extrudable film of a random copolymer of ethylene and acrylic acid (acid content 3±0.5% and melt index 8±1), while the opposite surface thereof had placed thereagainst a film of low density polyethylene.

Using driven rolls corresponding to 38 and 39 in FIGURES 4 and 5, a laminated base 40 was obtained in which the copolymer layer was about 6 mils and the polyethylene layer was approximately 5 mils in thickness. The base was then shaped into tubular form with an overlapping side seam and a side joint obtained with a tape sealer heated to about 400° F.

The continuous tubular body was next severed into predetermined length tube bodies 10, the bodies then headed as in FIGURE 6 employing either low or high density polyethylene as the thermoplastic head material, and an end seal formed as at 11 in FIGURE 1.

The tubes were then packed with a known fluoride-containing toothpaste having essential oils therein, and the filled tube bodies were exposed to a temperature of about 120° F. No delamination was visible after 60 days exposure, whereas a laminated tube body made up of polyethylene-aluminum foil-polyethylene layers showed severe delamination after only 4 or 5 days under the same conditions.

It is believed manifest from the foregoing that applicants have provided a collapsible container structure which completely avoids the problems heretofore unsolved by the prior art. The laminated tube bodies employ relatively low cost materials which can readily be formed into tubular shape and longitudinally seamed with a simple overlap. The heading step can be performed in a number of different ways, and the copolymer inner layer forms a secure bond with the head-piece during the forming or shaping thereof.

The outer layer can be any one of a number of different thermoplastics capable of fusion during the side seaming step and granting adequate protection to the metallic foil. However, the outer layer 15 can be eliminated if the foil barrier is of sufficient thickness to resist damage, and by flowing a thermoplastic material into the overlap side seam during the sealing thereof.

Further, the outer layer may be paper in a three-ply laminate formed of paper, foil and the named copolymer. A suitable adhesive would of course be used during the side seaming operation. Also, the invention contemplates four-ply laminates comprised of, from outside to in, polyolefin, paper, foil and copolymer, or, polyolefin, foil, paper and copolymer. Where required in these structures compatible adhesives would naturally be employed. Additionally, it is within the contemplation of this invention that the thermoplastic material used for molding the head-piece may be of the same composition as the copolymer used for the inner layer 17.

Various modifications of the invention have been disclosed herein, and these and other changes can of course be effected without departing from the novel concepts of the instant contribution.

We claim:

1. A collapsible dispensing container, comprising a deformable body portion having a plurality of laminations therein, one of said laminations being a copolymer of an olefin and a polar group-containing monomer co-polymerizable therewith and another of said laminations providing a barrier against fluid permeation therethrough, and a thermoplastic head portion mounted upon said body portion and fused to said one lamination along a band area at one end thereof.

2. A collapsible dispensing container, comprising a deformable body portion having a plurality of laminations therein, one of said laminations being a copolymer of an olefin and an ethylenically unsaturated carboxylic acid and another of said laminations providing a barrier against fluid permeation therethrough, and a thermoplastic head portion mounted upon said body portion and fused to said one lamination along a band area at one end thereof.

3. A collapsible dispensing container, comprising a deformable body portion having a plurality of laminations therein, one of said laminations being a copolymer of ethylene and an ethylenically unsaturated carboxylic acid and another of said laminations providing a barrier against fluid permeation therethrough, and a thermoplastic head portion mounted upon said body portion and fused to said one lamination along a band area at one end thereof.

4. A collapsible dispensing container, comprising a deformable body portion having a plurality of laminations therein, one of said laminations being a copolymer of ethylene and an acid of the group consisting of acrylic and alkacrylic acids and another of said laminations providing a barrier against fluid permeation therethrough, and a thermoplastic head portion mounted upon said body portion and fused to said one lamination along a band area at one end thereof.

5. A collapsible dispensing container, comprising a deformable body portion having a plurality of laminations therein, one of said laminations being a random copolymer of ethylene and acrylic acid and another of said laminations providing a barrier against fluid permeation therethrough, and a thermoplastic head portion mounted upon said body portion and fused to said one lamination along a band area at one end thereof.

6. A collapsible dispensing container, comprising a deformable body portion having a plurality of laminations therein, the inner of said laminations being a copolymer of an olefin and a polar group-containing monomer co-polymerizable therewith, the outer of said laminations being a polyolefin, and the intermediate of said laminations being a metallic foil, and a thermoplastic head portion mounted upon said body portion and fused to the inner of said laminations along a band area at one end thereof.

7. A collapsible dispensing container, comprising a deformable body portion having a plurality of laminations therein, the inner of said laminations being a copolymer of an olefin and a polar group-containing monomer co-polymerizable therewith, the outer of said laminations being a cellulosic material, and the intermediate of said laminations being a metallic foil, and a thermoplastic head portion mounted upon said body portion and fused to the inner of said laminations along a band area at one end thereof.

8. A collapsible dispensing container, comprising a deformable body portion having a plurality of laminations therein, one of said laminations being a copolymer of an olefin and an ethylenically unsaturated carboxylic acid and another of said laminations providing a barrier against fluid permeation therethrough, and a thermoplastic head portion having a stepped marginal area fused to said one lamination along a band area at one end thereof whereby said one end of said one lamination and said head portion present a smooth, continuous and uninterrupted surface.

9. A collapsible dispensing container, comprising a deformable body portion having inner and outer layers and an interlayer bonded thereto, the inner of said layers being a copolymer of ethylene and an acid of the group consisting of acrylic and alkacrylic acids, the interlayer being a metallic foil, and the outer of said layers being a material selected from the group consisting of a polyolefin and a copolymer of the same character as said inner layer; and a relatively rigid head portion formed of a polyolefin bonded to said inner layer along a band area at one end thereof with said outer layer and the outer surface of said head portion presenting a substantially uninterrupted outline.

10. A collapsible dispensing container of the character defined in claim 9, in which one surface of said interlayer has secured thereto a layer of cellulosic material.

11. A method of producing collapsible dispensing containers, comprising forming into tubular shape a laminated base material having as one of the layers thereof a copolymer of an olefin and a polar group-containing monomer co-polymerizable therewith and having as another of the layers thereof a fluid impermeable barrier, and bonding to said copolymer layer a thermoplastic head member to provide a fused connection therewith along a band area of said copolymer layer at one end thereof.

12. A method of producing collapsible dispensing containers, comprising forming into tubular shape a laminated base material having as one of the layers thereof a copolymer of ethylene and an acid of the group consisting of acrylic and alkacrylic acids and having as another of the layers thereof a fluid impermeable barrier, and bonding to said copolymer layer a thermoplastic head member to provide a fused connection therewith along a band area of said copolymer layer at one end thereof.

13. A method of producing collapsible dispensing containers, comprising providing a laminated base material which includes a metallic interlayer and first and second layers bonded to the opposite surfaces thereof, the first layer being a copolymer of ethylene and an acid of the group consisting of acrylic and alkacrylic acids, the interlayer being a metallic foil, and the second layer being a material selected from the group consisting of a polyolefin and a copolymer of the same character as said first layer, shaping said laminated base material to tubular form with said first layer on the inside thereof and said first and second layers bonded to one another in seamed relation, and molding a quantity of thermoplastic material to the configuration of a head-piece and simultaneously bonding the same to said first layer of said tubular form along a band area of said first layer at one end thereof.

14. A method of producing collapsible dispensing containers, comprising providing a laminated base material which includes a metallic interlayer and first and second layers bonded to the opposite surfaces thereof, the first layer being a copolymer of ethylene and an acid of the group consisting of acrylic and alkacrylic acids, the interlayer being a metallic foil, and the second layer being a material selected from the group consisting of a polyolefin and a copolymer of the same character as said first layer, shaping said laminated base material to tubular form with said first layer on the inside thereof and said first and second layers bonded to one another in seamed relation, locating said tubular form upon a male die member, positioning said male die member with tubular form thereon in a female die member, and while said male and female die members are so positioned, molding a quantity of thermoplastic material to the configuration of a head-piece and simultaneously bonding the same to said first layer of said tubular form along a band area of said first layer at one end thereof.

15. A method of producing collapsible dispensing containers as defined in claim 11, in which the copolymer is a random copolymer of ethylene and acrylic acid, also in which the copolymer layer is disposed on the inside of the tubular shape, and in which there is bonded to the the opposite surface of the fluid impermeable barrier a layer of a material selected from the group consisting of cellulosics and thermoplastics.

16. A method of producing collapsible dispensing containers as defined in claim 13, in which the metallic foil interlayer is preheated prior to being bonded to said first and second layers.

17. A collapsible tube comprising a composite tubular body resistant to delamination and stress cracking and a headpiece fused to one end thereof, said body being shaped from a preformed laminated construction wound in a single turn with its longitudinal edges overlapped and fused in a longitudinal side seam, said laminated body including a thin metallic foil ply and a thermoplastic ply bonded coextensively to the interior surface of said foil ply, said thermoplastic ply being a copolymer of ethylene and an acid selected from the group consisting of acrylic acid and an alkacrylic acid.

18. A collapsible tube comprising a composite tubular body resistant to delamination and stress cracking and a headpiece fused to one end thereof, said body being shaped from a preformed laminated construction wound in a single turn with its longitudinal edges overlapped and fused in a longitudinal side seam, said laminated body including a thin metallic foil ply and thermoplastic plies bonded coextensively to the opposite surfaces of said foil ply, said thermoplastic plies being a copolymer of ethylene and an acid selected from the group consisting of acrylic acid and an alkacrylic acid.

19. The structure set forth in claim 17 wherein said laminated body includes additional plies laminated exteriorly of said foil ply, at least one of which is a ply of polyethylene.

20. The structure set forth in claim 19 wherein said additional plies include a paper ply.

21. The structure set forth in claim 19 wherein said polyethylene ply is the outermost of said additional plies and is transparent, and further including printing media disposed exteriorly of said foil ply beneath said polyethylene ply.

22. The structure set forth in claim 17 wherein said copolymer has a melt index of between 1 and 50 and an acid content of from about 0.5 to 20 percent by weight.

23. The structure set forth in claim 17 wherein said copolymer has a melt index of between 7 and 9 and an acid content of from about 2.5 to 3.5 percent by weight.

24. The structure set forth in claim 23 wherein said acid is acrylic acid.

References Cited by the Examiner

UNITED STATES PATENTS

| | | | |
|---|---|---|---|
| 2,729,361 | 1/1956 | Ephron | 222—92 |
| 2,794,574 | 6/1957 | McGeorge et al. | 222—92 |
| 2,833,683 | 5/1958 | Quandt | 156—69 |
| 2,913,768 | 11/1959 | Lecluyse et al. | 156—69 |

RAPHAEL M. LUPO, *Primary Examiner.*

EARL M. BERGERT, *Examiner.*

W. VANBALEN, *Assistant Examiner.*